United States Patent [19]

Kudo et al.

[11] 4,374,031
[45] Feb. 15, 1983

[54] METHOD FOR MANUFACTURING POLYESTER FIBERS WITH GOOD ADHESION TO RUBBER

[75] Inventors: Kazushige Kudo, Joyo; Shigeo Yamamoto; Shigemitsu Murase, both of Uji, all of Japan

[73] Assignee: Unitika Limited, Osaka, Japan

[21] Appl. No.: 268,310

[22] Filed: May 29, 1981

[30] Foreign Application Priority Data

Jun. 6, 1980 [JP] Japan .................. 55-76944

[51] Int. Cl.³ .................. D06M 15/12; D06M 15/36
[52] U.S. Cl. .................. 252/8.8; 427/386; 528/73
[58] Field of Search .................. 252/8.8; 427/386; 528/73

[56] References Cited

U.S. PATENT DOCUMENTS

| | | | |
|---|---|---|---|
| 2,724,694 | 11/1955 | Troianello | 252/8.8 |
| 3,297,570 | 1/1967 | White et al. | 252/8.8 |
| 3,519,561 | 7/1970 | Kelly et al. | 252/8.8 |
| 3,803,035 | 4/1974 | Bhakuni et al. | 252/8.8 |
| 4,248,938 | 2/1981 | Takata et al. | 427/386 |

FOREIGN PATENT DOCUMENTS

| | | | |
|---|---|---|---|
| 51-70394 | 6/1976 | Japan | 427/386 |
| 2015000 | 9/1979 | United Kingdom | 528/111 |

*Primary Examiner*—Maria Parrish Tungol
*Attorney, Agent, or Firm*—Richard A. Anderson

[57] ABSTRACT

This invention is a method for manufacturing polyester fibers with good adhesion to rubber, characterized in that in the process of making the filaments, a filament-making oil (spin finish) containing epoxy, blocked isocyanate, and polyoxyalkylene amine compounds is added to the polyester fibers, and they are then heat-treated.

13 Claims, No Drawings

METHOD FOR MANUFACTURING POLYESTER FIBERS WITH GOOD ADHESION TO RUBBER

BACKGROUND OF INVENTION

This invention concerns a method for manufacturing polyester fibers with good adhesion to rubber, particularly by using a spin finish containing epoxy compound, blocked isocyanate compound and polyoxyethylene amine compound. Polyester fibers, such as polyethylene terephthalate, are fibers which have superior physical and chemical properties, are produced industrially in large quantities, and are extremely useful in many fields. They are also very suitable materials for use as reinforcers of various kinds of rubber.

However, polyester fibers have a great defect in that their adhesion to rubber is inferior to polyamides such as nylon 6, nylon 66, etc., which are also representative industrial fibers.

If polyamide fibers are treated only with a resorcinol-formaldehyde-latex (RFL) adhesive, they have very good adhesion to rubber. In the case of polyester fibers, even if they are treated with RFL, good adhesion cannot be obtained.

Consequently, for some time many attempts have been made to improve the adhesion of polyester fibers and rubber. Representative methods include (1) when treating the raw cord textile by the so-called "dipping" RFL treatment, it is pretreated, before the RFL treatment, with an adhesive such as an epoxy compound, etc., or by mixing a novolak resin or an esterophilic ingredient such as 2,6-bis(2',4'-dihydroxyphenyl-methyl)-4-chlorophenol, known by the trade name of "Pexul," with the RFL and dip-treating the textile; (2) adding an adhesive such as an epoxy, isocyanate, etc. compound at the yarn stage, and then dip-treating with RFL. Although the former method does provide a certain amount of the desired adhesion, it has defects such as the fact that the amount of the adhesive used is great and the treatment method is troublesome, etc., so that the cost is increased. The latter method, although it has the practical advantage that like the polyamide fibers, the later dipping treatment can be performed with RFL alone, it has the disadvantage that the essential adhesion is somewhat unsatisfactory. Consequently, in order to increase the adhesion in the latter method, the concentration of the adhesive used in treating the yarn is markedly increased, or the heat-treating conditions are made extremely severe, etc., so that the treatment method of the yarn itself must deviate greatly from the range of practicality, which causes new problems.

Many methods of adding epoxy compounds to polyester fibers at the time of making the filaments are known, but the conventional methods all have the defects that, as mentioned above, their adhesion is not yet sufficient or they require severe treatment conditions far beyond practicality, etc., so they cannot be considered satisfactory methods. Also, many methods of adding isocyanate compounds at the time of making polyester fiber filaments have also been proposed, but these methods are also unsatisfactory from the viewpoints of adhesion or productivity. Furthermore, methods of adding both epoxy and isocyanate adhesives at the time of making polyester fiber filaments are also known, but although these methods are somewhat better from the viewpoint of adhesion than the cases in which epoxy compounds or isocyanate compounds are added separately, they have nevertheless not been able to reach a satisfactory level of performance with the existing technology.

Thus, as shown by the fact that many patents exist for methods of adding epoxy and isocyanate compounds alone, the development of methods for adding these adhesives effectively has been a prominent technological problem, and it may be easily inferred by anyone in the industry that good adhesion cannot be simply and easily obtained merely by adding these adhesives one by one.

SUMMARY OF THE INVENTION

Against this background, the present invention makes it possible to manufacture a polyester fiber which shows good adhesion to rubber by the extremely simple method of adding an adhesive at the same time as the filament-making oil (spin finish) is added when the polyester fiber filament is made and using a heat treatment during the later stretching process; the polyester fiber with good adhesion to rubber is then obtained simply by later performing the RFL treatment.

This invention is characterized in that in the process of making the filaments, a filament-making oil (spin finish) containing epoxy, blocked isocyanate, and polyoxyalkylene amine compounds is added to the polyester fibers, and they are then heat-treated.

The present inventors, as a result of careful study of the problem of how to increase adhesion by adding epoxy and blocked isocyanate compounds, discovered that if polyoxyalkylene amine compounds (called "POA amines" in the following) are also present, the stability of the filament-making oil (spin finish) as a whole, its proper degree of permeability into the fiber, and its proper degree of effect on the bridge-forming reaction of the adhesive, etc. are all shown in a good overall balance, and the adhesion is increased to a surprising degree.

The method of treatment by combining epoxy and blocked isocyanate compounds in the filament making oil (spin finish) is itself not seen in conventional methods, but a further novelty in the method of the present invention is the joint use of POA amines which would be very hard to infer from conventional methods.

POA amines themselves are well known as ingredients of fiber-finishing agents, particularly ingredients which function as penetrating agents, but this invention is the first to use the method of adding them together with epoxy and blocked isocyanate compounds and is completely unknown among conventional methods.

This invention, as is clear from the above explanation, is a completely new method, unlike the conventional ones, and makes possible the manufacture of polyester fibers with extremely good properties, as well as being fully provided with practical value from the viewpoint of production.

The polyester in this invention is a poly-condensate of a compound containing two ester-forming OH groups such as ethylene glycol and a compound containing two ester-forming carboxyl groups such as terephthalic acid; a representative example is polyethylene terephthalate. But the polyester is not limited to homopolymers; it may also be a copolymer, and a compound with three or more ester-forming groups may be a copolymerization ingredient also, as long as the fiber formation ability is not damaged.

The epoxy compound in this invention is an ordinary epoxy compound containing a halogen, e.g., a compound synthesized by the reaction of epichlorohydrin with an alcohol or phenol. Examples of these alcohols or phenols are polyhydric alcohols such as glycerol, ethylene glycol, diethylene glycol, propylene glycol, sorbitol, polyethylene glycol, polypropylene glycol, trimethylol propane, or their derivatives; and polyhydric phenols such as resorcinol, catechol, hydroquinone, or their derivatives. Moreover, cyclohexane epoxides, diglycidyl ethers, etc., obtained by oxidizing unsaturated bonds with peracetic acid, etc., may also be used.

The blocked isocyanate compound used in this invention is an addition compound of an isocyanate compound and a blocking agent. The blocking agent is liberated by heating, producing an active isocyanate compound. For example, isocyanate compounds such as hexamethylene diisocyanate, polymethylene polyphenylene isocyanate, methylene-bis(4-phenyl isocyanate) toluene diisocyanate, metaphenylene diisocyanate, triphenylmethane, triisocyanate, etc., are blocked by phenols or alcohols such as phenol, thiophenol, cresol, butanol, cetyl alcohol, etc.

Moreover, the POA amine in this invention is a compound obtained by adding 3–20 mol of an alkylene oxide chosen from ethylene oxide, propylene oxide, or butylene oxide to an organic amine with an $>$NH group or a $-NH_2$ group. Concrete examples of these organic amines are lauryl amine, stearyl amine, cetyl amine, ethylene diamine, hexamethylene diamine, decamethylene diamine, diethylene triamine, monoethanol amine, diethanol amine, polyethylene imine, para-phenylene diamine, melamine, dioleyl amine, etc. Of course, the amine used is not limited to these, but may be any of the amines defined above.

If the number of mol of alkylene oxide added to this POA amine is 20 or less, the desired effectiveness of this invention is difficult to obtain. If it is greater than 20 mol, the effectiveness of the POA amine is also reduced; particularly in this case it comes to have the same characteristics as other polyoxyalkylene compounds used as emulsification dispersants and is not particularly desirable. These POA amines are, of course, different from the specific organic amines which are ordinarily used as hardening catalysts for epoxy or isocyanate compounds; these organic amines can be used as desirable catalysts in this invention also. The POA amines of this invention are not used as catalysts substituting for the conventional organic amines, but are used as completely new additives.

The filament-making oil (spin finish) in this invention contains, besides the above-mentioned three compounds, natural oils such as mineral oils, cocoanut oils, sperm oil, etc., or synthetic oils, such as esters of higher alcohols or polyhydric alcohols and higher fatty acids, etc., as smoothing (lubricating) agents, and may also include sufficient surfactant to emulsify and disperse this smoothing (lubricating) agent ingredient, as well as, when necessary, antistatic agents, heat-resisting agents, reaction-promoting agents (hardening catalysts), coloring agents, etc. There is no necessity to use surfactants as emulsifying and dispersing agents, but, in general, one may advantageously use esters of compounds in which alkylene oxides are added to higher alcohols, or polyethylene glycols and higher fatty acids. Of course, such surfactants may also be used as emulsifying and dispersing agents of the epoxy or blocked isocyanate compounds.

The proportions of the ingredients in the filament-making oil (spin finish) should be 5–40 weight percent epoxy compound, 3–30 weight percent blocked isocyanate compound, 2–30 weight percent POA amine, 20–70 weight percent smoothing (lubricating) agent, 10–50 weight percent emulsifier, and other additives up to 100 weight percent.

If the proportions are within these ranges, the desired increase in adhesion is well shown without losing the essential smoothing (lubricating) and binding functions of the filament-making oil (spin finish).

The "filament-making processes" mentioned above are the spinning, winding, stretching, and winding processes, but, of course, the spin-draw method in which the spinning and stretching processes are directly combined may also be used. The filament-making oil (spin finish) may be added at any of these stages by the roller, immersion, spray or other methods. The filament-making oil (spin finish) may be used in the ordinary aqueous emulsion form, but it may also be used as a straight oil diluted with low-viscosity mineral oil, etc., as long as the dispersing and emulsification of the adhesive is possible. The addition of the oil may be performed two or more times; it is preferable for the total quantity of oil added to be 0.2–2 weight percent. One may combine the treatment with the filament-making oil of this invention with treatment by a filament-making oil which does not contain some or all of the following: the epoxy compound, the blocked isocyanate compound, and the POA amine. After the addition, a heat treatment is performed at 150°–250° C. for 0.5–several seconds. The method of heat treatment may be hot plate, hot roller, slit heater, oven, etc. This heat treatment can be completely applied at the time of the stretching process; in other words, the heat treatment conditions of the stretching process can themselves be made into the heat treatment conditions necessary for this invention, so that it is very practical. The simplest way of applying the method of this invention is to use the filament-making oil (spin finish) of this invention itself as the spinning oil, and then to perform the ordinary heat stretching treatment. Thus, this invention has the great practical advantages that it can be applied as a filament-making oil and that it does not require the severe heat treatment conditions of conventional methods.

Of course, there are no restrictions on properties of the polyester fibers of this invention such as molecular weight, denier, number of filaments, form of cross section, yarn properties, microscopic structure, presence or absence of additives, and polymer properties (concentration of terminal carboxyl groups, etc.).

The polyester fibers obtained by the method of this invention become very adhesive to rubber merely by the ordinary RFL treatment after ordinary twisting and weaving.

The improvement in adhesion is not limited to the improvement in the polyester fiber itself, but is also directly connected with an improvement in the quality of the rubber articles which are strengthened, so that this invention has great practical effectiveness.

DESCRIPTION OF PREFERRED EMBODIMENTS

Below, this invention is explained by actual examples. The measurement of the intrinsic viscosity in the actual examples was performed in a mixed solvent (phenol/ethane tetrachloride, 1 to 1 wt. ratio) at 20° C.

The measurement of adhesive force with rubber was performed by the method described below by the technique of measuring of the adhesive force of the original yarn→raw cord (twisting together)→dip cord (dip treatment)→burying in the rubber and vulcanizing-→cord and rubber.

The making of the raw cord was performed by the method of twisting with a ring twining machine at 40 twists/10 cm, and then twining two of these, also at 40 twist/10 cm.

The dip treatment was performed under the following conditions:

| Solution A | |
|---|---|
| Resorcinol | 15 parts |
| Formalin | 20 parts |
| Caustic soda | 0.4 parts |
| Water | 290 parts |
| Solution B | |
| Vinyl pyridine - butadiene-styrene latex solution (40%) | 240 parts |
| Butadiene-styrene latex (40%) | 80 parts |
| Water | 347 parts |

Solution A was cured at 25° C. for 6 hours, and Solution B at 25° C. for 4 hours. The two were then mixed and cured at 25° C. for an additional 12 hours.

| Dipping Conditions | |
|---|---|
| Target dip adhesion quantity (solid part) | 5 percent |
| Drying zone | 80° C. × 30 seconds |
| Curing zone (2 chambers) | 230° C. × 80 seconds × 2 times |

The method of vulcanization was as follows. The dipped cord was buried in an H-test mold in unvulcanized rubber, the main ingredients of which were 30 parts smoked sheet, 70 parts styrene-butadiene rubber, 40 parts carbon black, 5 parts zinc oxide, 1.5 parts stearic acid, 1 part phenyl-beta-naphthylamine, and 0.3 part anhydrous phthalic acid, 0.8 part vulcanization accelerator, 0.15 part diphenylguanidine, and 2 parts sulfur. This was then heated at 140° C. for 40 minutes to vulcanize and adhere.

The method of measuring the adhesive force was the so-called H-test method. That is, the amount of load needed to strip the cord from rubber 1 cm thick was measured.

ACTUAL EXAMPLE 1

Polyethylene terephthalate with an intrinsic viscosity of 0.95 was spun using an extruder melt spinner at the melting temperature of 290° C., extrusion quantity 450 grams per minute, and winding speed 450 m/minute. Then the seven types of spinning oils shown in Table 1 were added, so that the quantity added was 0.9 weight percent, and the yarn was wound.

Next, it was stretched and heat-treated with a multistage stretching machine composed of a No. 1 roller (100° C.), a No. 2 roller (100° C.), a hot plate (240° C.), a No. 3 roller (230° C.), and a winding roller. The conditions of treatment were: time of passing over the hot plate, 0.2 second; effective treatment time with No. 3 roller, 0.2 seconds; total stretching ratio, 6.0 times; winding speed 200 m/minute. In this way a 1500 denier/192 filament polyethylene terephthalate fiber was obtained.

TABLE 1

| Number | 1 | 2 | 3 | 4 | 5 | 6 | 7 |
|---|---|---|---|---|---|---|---|
| SMOOTHING AGENT | | | | | | | |
| Isostearyl oleate | 30 | 30 | 20 | 30 | 30 | 30 | 40 |
| Glycerin oleate | — | — | 10 | 5 | — | 5 | 20 |
| EMULSIFYING AGENT | | | | | | | |
| POE (20) castor oil | 10 | 10 | — | 5 | 10 | 10 | 10 |
| PEG (molecular weight 400) monostearate | 10 | 15 | 5 | 20 | 15 | — | 15 |
| POE (10) nonyl phenol | — | — | 20 | — | 10 | 20 | 5 |
| ADDITIVES | | | | | | | |
| Epikote 812 | 20 | 25 | 5 | 30 | 25 | — | — |
| Hylene | 15 | 5 | 30 | — | 5 | 30 | — |
| POE (10) MP stearyl amine | 10 | — | 5 | 5 | — | — | 5 |
| POE (7) lauryl amine | — | 10 | — | — | — | — | — |
| OTHERS | | | | | | | |
| Diethylene triamine | 0.5 | 0.5 | 0.5 | 0.5 | 0.5 | 0.5 | — |
| Dioctyl sulfosuccinate Na | 4.5 | 4.5 | 4.5 | 4.5 | 4.5 | 4.5 | 5 |
| TOTAL | 100 | 100 | 100 | 100 | 100 | 100 | 100 |

Notes:
1. Proportions are weight %. When adding, 20% aqueous emulsions were used.
2. "POE (20)" means "20 mol ethylene oxide added" (similarly below).
3. "Epikote 812" is a trade name of the Shell Chemical Co.; it is an epoxy compound with glycerin diglycidyl ether as the principal ingredient.
4. "Hylene MP" is a trade name of the duPont Co.; it is a diphenyl methane diisocyanate blocked by phenol.
5. Numbers 1–3 are examples of this invention; Numbers 4–7 are comparison examples.

At the time of the spinning, the oils of this invention, Numbers 1, 2, and 3 had good stability of the oil and smoothness, and the operation was performed smoothly, but the other oils, Numbers 4–7, were lacking in stability and were therefore unsuitable for spinning.

The yarn obtained was twisted to make raw cord; this was then dip treated with RFL solution, and the adhesion of this treated cord and rubber was measured; the results are shown in Table 2.

TABLE 2

| Number | Adhesion (kg/cm) | Notes |
|---|---|---|
| 1 | 17.8 | Example of this invention |
| 2 | 17.5 | Example of this invention |
| 3 | 17.7 | Example of this invention |
| 4 | 13.2 | Comparison examples |
| 5 | 14.5 | Comparison examples |
| 6 | 13.9 | Comparison examples |

TABLE 2-continued

| Number | Adhesion (kg/cm) | Notes |
| --- | --- | --- |
| 7 | 8.4 | Comparison examples |

As is clear from Table 2, Numbers 1, 2 and 3, which satisfy the conditions of this invention, are markedly higher adhesions than the comparative examples, Numbers 4, 5, 6 and 7. In particular, the difference between Comparison Example 5 and Example 2 of this invention is clearly due to the presence or absence of the POA amine.

ACTUAL EXAMPLE 2

A polyethylene terephthalate fiber was made by the same method as in Actual Example 1, using the spinning oils shown in Table 3. The results of testing their adhesion abilities are also shown in Table 3.

As is clear from Table 3, Examples Numbers 8–12 of this invention are more highly adhesive than Comparative Examples Numbers 13 and 14. Also, in the operability during spinning, Examples Numbers 8–12 of this invention were all better than Comparative Examples Numbers 13 and 14.

TABLE 3

| Number | 8 | 9 | 10 | 11 | 12 | 13 | 14 |
| --- | --- | --- | --- | --- | --- | --- | --- |
| SMOOTHING AGENT | | | | | | | |
| Mineral oil (600 sec) | 30 | — | — | 10 | — | 30 | — |
| Cocoanut oil | — | 30 | — | — | — | — | — |
| Rapeseed oil | — | — | 30 | 30 | 20 | — | 30 |
| EMULSIFIER | | | | | | | |
| POE (15) hardened castor oil | 5 | 5 | 5 | 5 | 5 | 5 | 10 |
| POE (20) lauryl phenol | 5 | 5 | 5 | 5 | 5 | 15 | 5 |
| PEG dioleate (molecular wt. 600) | 5 | 5 | 5 | 13 | 5 | 5 | 10 |
| ADDITIVES | | | | | | | |
| Denacol EX-421 | 27 | 27 | 27 | 15 | 15 | 27 | 27 |
| Cetyl alcohol-blocked diphenyl methane diisocyanate | 13 | 13 | 13 | 15 | 15 | 13 | 13 |
| POE (3) stearyl amine | 10 | — | 5 | 2 | 15 | — | — |
| POE (3) hexamethylene diamine | — | 10 | 5 | — | 15 | — | — |
| OTHERS | | | | | | | |
| Meta-phenylene diamine | 0.3 | 0.3 | 0.3 | 0.3 | 0.3 | 0.3 | 0.3 |
| Dioctyl sulfosuccinate Na | 4.7 | 4.7 | 4.7 | 4.7 | 4.7 | 4.7 | 4.7 |
| Total | 100 | 100 | 100 | 100 | 100 | 100 | 100 |
| Adhesion force (kg/cm) | 17.5 | 17.1 | 17.4 | 16.8 | 16.9 | 14.9 | 14.8 |

Notes:
1. The proportions of ingredients in the table are in weight %. 20% Aqueous emulsions were used.
2. "Denacol EX-421" is a trade name of Nagase Sangyo KK; it is an epoxy compound with a triglycidyl ether of diglycerin as the principal ingredient.
3. Numbers 8–12 are examples of this invention; Numbers 13–14 are comparative examples.

ACTUAL EXAMPLE 3

A polyethylene terephthalate with an intrinsic viscosity of 0.90 was spun and, without winding, was fed to a spin-draw apparatus composed of a No. 1 roller (separate roller), No. 2 roller (Nelson roller, 150° C.), No. 3 roller (Nelson roller, 200° C.), No. 4 roller (Nelson roller, 210° C.), and No. 5 roller (separate roller, 230° C.). It was stretched in two stages, a total of 6.0 times. Finally, it was wound at 1000 m/min, producing a 1500 denier/192 filament polyethylene terephthalate fiber. During this process, a straight oil with low viscosity mineral oil, cocoanut oil, etc., as the principal ingredients was added to the spun yarn at 0.5 weight % and, between rollers Numbers 4 and 5, oils Numbers 2 and 5 of Actual Example 1 were added at 1.0 weight % each. Heat treatment was performed by the No. 5 roller for one second. The adhesion of the fiber obtained was 16.4 kg/cm with the No. 2 oil and 13.2 kg/cm with the No. 5 oil, showing the superiority of the former, an example of this invention.

We claim:

1. A spin finish for polyester fibers to improve adhesion to rubber comprising a lubricating agent and surfactant and
   (a) from about 5 to about 40 percent by weight of the finish of an epoxy compound,
   (b) from about 3 to about 30 percent by weight of the finish of a blocked isocyanate compound, and
   (c) from about 2 to about 30 percent by weight of the finish of a polyoxyalkylene amine compound obtained by reacting 3 to 20 mols of an alkylene oxide selected from the group consisting of ethylene oxide, propylene oxide and butylene oxide with an organic amine containing >NH or —$NH_2$ groups.

2. The finish of claim 1 wherein the lubricating agent is present in an amount between about 20 and about 70 percent by weight of the finish and the emulsifier is present in an amount between about 10 and 50 percent by weight of finish.

3. The finish of claim 2 wherein the epoxy compound is synthesized by the reaction of epichlorohydrin with an alcohol or phenol.

4. The finish of claim 3 wherein the epoxy compound is selected from the group consisting of compounds having double bond oxidized with peracetic acid, the reaction product of epichlorohydrin with a polyhydric alcohol, and the reaction product of epichlorohydrin with a polyhydric phenol.

5. The finish of claim 2 wherein the blocked isocyanate compound is the addition compound of an isocyanate compound and a blocking agent.

6. The finish of claim 5 wherein the blocking agent is selected from the group consisting of phenol and alcohol.

7. The finish of claim 6 wherein the isocyanate compound to be blocked is selected from the group consisting of hexamethylene diisocyanate, polymethylene polyphenylene isocyanate, methylenebis(4-phenyl isocyanate), toluene diisocyanate, metaphenylene diisocyanate, triphenylmethane triisocyanate and the blocking agent is selected from the group consisting of phenol, triophenol, cresol, butanol, and cetyl alcohol.

8. The finish of claim 1 wherein the organic amine is selected from the group consisting of lauryl amine, stearyl amine, cetyl amine, ethylene diamine, hexamethylene diamine, decamethylene diamine, diethylene triamine, monoethanol amine, diethanol amine, polyethylene imine, para-phenylene diamine, melamine, and dioleyl amine.

9. The method of producing polyester yarn with improved adhesion to rubber comprising
  (i) applying a spin finish containing lubricating agent, surfactant and
    (a) from about 5 to about 40 percent by weight of the finish of an epoxy compound,
    (b) from about 3 to about 30 percent by weight of the finish of a blocked isocyanate compound, and
    (c) from about 2 to about 30 percent by weight of the finish of a polyoxyalkylene amine compound obtained by reacting 3 to 20 mols of an alkylene oxide selected from the group consisting of ethylene oxide, propylene oxide and butylene oxide with an organic amine containing $>$NH or $-NH_2$ groups, to the polyester yarn, and
  (ii) heating the yarn at a temperature of from between about 150° C. to about 250° C. for up to several seconds.

10. The method of claim 9 wherein the heating is for from about 0.05 to several seconds.

11. The method of claim 10 wherein the heating is for from about 0.2 to about one second.

12. The method of claim 9 wherein the lubricating agent is present in an amount between about 20 and about 70 percent by weight of the finish and the emulsifier is present in an amount between about 10 and 50 percent by weight of finish.

13. The method of claim 9 wherein from between about 0.2 to about 2 percent by weight of yarn of finish is applied to the yarn.

* * * * *